United States Patent
Heed et al.

[11] Patent Number: 6,091,327
[45] Date of Patent: Jul. 18, 2000

[54] SYSTEM FOR SURVEILLANCE

[75] Inventors: Martin Henning Heed, Kungsbacka; Sten Hugo Nils Ahlbom, Västra Frölunda; Bengt Lennart Andersson, Kullavik, all of Sweden

[73] Assignee: Telefonaktiebolaget LM Ericsson, Stockholm, Sweden

[21] Appl. No.: 08/648,271

[22] Filed: May 15, 1996

[30] Foreign Application Priority Data

May 15, 1995 [SE] Sweden ................................. 9501787

[51] Int. Cl.$^7$ .............................. G08B 29/00; G08B 1/08
[52] U.S. Cl. ....................... 340/506; 340/539; 340/825.49
[58] Field of Search .................... 340/506, 539, 340/825.69, 825.72, 825.36, 825.49; 342/357, 450

[56] References Cited

U.S. PATENT DOCUMENTS

| | | | |
|---|---|---|---|
| 4,742,357 | 5/1988 | Rackley | 340/988 |
| 4,750,197 | 6/1988 | Denekamp et al. | 340/825.35 |
| 5,057,820 | 10/1991 | Markson et al. | 340/981 |
| 5,157,610 | 10/1992 | Asano et al. | 364/424.03 |
| 5,223,844 | 6/1993 | Mansell et al. | 342/457 |
| 5,268,668 | 12/1993 | Berube | 340/505 |
| 5,334,974 | 8/1994 | Simms et al. | 340/990 |
| 5,349,333 | 9/1994 | Björkman | 340/540 |
| 5,396,220 | 3/1995 | Markson et al. | 340/522 |
| 5,504,489 | 4/1996 | Kronhamn | 342/118 |
| 5,512,909 | 4/1996 | Kronhamn | 342/118 |
| 5,515,043 | 5/1996 | Berard et al. | 340/988 |

FOREIGN PATENT DOCUMENTS

| | | |
|---|---|---|
| 391 251 | 2/1977 | Sweden . |
| 7807151 | 12/1979 | Sweden . |
| WO 96/27513 | 9/1996 | WIPO . |

*Primary Examiner*—Donnie L. Crosland
*Attorney, Agent, or Firm*—Burns, Doane, Swecker & Mathis, L.L.P.

[57] ABSTRACT

A system for surveillance of, and taking measures in respect of, phenomena that are observable. The system includes at least one information center with associated cells that can be divided into one or more groups. The system also includes means for communication between an information center and each cell. Each cell includes at least one sensor, with which chemical or physical measuring methods can be used to observe the phenomenon or detect the signals which the phenomenon generates. This system further includes at least three cells that are distributed geographically in the area of interest in a sufficiently dense net. In the cells the signals can be used for determining for example the time, place, intensity or the type of the phenomenon. Data can be transferred from the cells to their respective information center for processing. Activities can be initiated and carried out by equipment inside or outside the cells in accordance with rules in the cells, and these activities can be started as a response to the detected signals.

26 Claims, 3 Drawing Sheets

SYSTEM FOR SURVEILLANCE

BACKGROUND

The present invention relates to an arrangement for surveillance of and the possibility of action in, a large geographical area.

Over a large geographical area—a border area, a province, a coastline, a large road network, an urban area etc., there is often a need to watch over and monitor certain defined phenomena which are observable using chemical or physical measuring methods. The phenomena can for example be detected with the aid of the signals which the phenomena generate/emit. The phenomena may be rain fronts, pollution, illegal intrusion of people, vehicles, boats, aircraft or helicopters and the signals may for example be acoustic, chemical, optical or electromagnetic.

The meteorological service forms an idea about rain fronts nowadays with information from different types of satellite, weather radar, manual observations etc. These methods cover the entire country but cannot give any immediate information on how much rain actually falls in individual places and with what intensity.

In this respect, it emerges that, even with complicated equipment, these cannot provide all the answers the meteorological service and the public, and particularly farmers, want to receive. Regional road administration bodies and local authorities also have a great need to be forewarned about rainfall of great intensity.

Air pollution is an increasingly important matter for everyone and nevertheless there is only a small number of permanent measuring stations in the country around inter alia nuclear power stations. Most measurements of air pollution which take place appear to be carried out by a small number of expensive and complicated mobile measuring stations.

As a result of the fact that use is made of a small number of mobile measuring stations, these cannot of course be in the "right" place to discover new air pollution, nor can these few measuring stations follow and indicate the spread of any air pollution.

Illegal intrusion sometimes consists of only intrusion of signals or a combination of physical intrusion and intrusion of signals. An example of such a phenomenon is reconnaissance radar. It is of course desirable to repel an undesirable reconnaissance radar together with its radar signals. If it is not possible to repel the reconnaissance radar physically, it is always possible to "repel" its radar signals with the aid of jamming/interference.

If it is assumed that a reconnaissance radar with high power output, large antenna gain and low antenna aide lobe levels is used, a commonly applied method of jamming, which reduces the range of an individual such reconnaissance radar, is to make use of a suitably located jammer unit. Such a jammer unit transmits noise interference for example with high antenna gain/high power output around the active transmitting frequency of the reconnaissance radar. Since the transmitting lobe of the jammer must be narrow in order for the antenna gain to be sufficiently great, the narrow transmitting lobe of the jammer has to be accurately directed towards the radar to which jamming is to be caused. This jammer can achieve the intended effect even when the side lobes of the reconnaissance radar receive the interference radiation. Jammers of this type are profitable to counteract.

This is an example of how the effect which is desired can only be achieved to a reasonable degree if the action is taken on a favourable and precise occasion and/or from a narrowly defined direction. This in turn requires advanced equipment which is sometimes so costly to purchase and keep in operation that the number is restricted so severely that the equipment must be transported to operational proximity to the area of interest just when the need arises. This means losses of time, transport risks and gaps in the total area of coverage.

The costs of achieveing a definite effect are often very heavily dependent on the distance to the area of action, and this is clearly so in a military context.

SUMMARY

One aim of the present invention is therefore to indicate a system which, in a simple manner, makes It possible to monitor and if appropriate initiate measures in a large geographical area.

Another aim of the present invention is to create a system by means of which the possibility is afforded of, at a low price, achieving satisfactory coverage in the case of measures taken within and surveillance of a large geographical area.

Said aims are achieved by means of a system for surveillance of, and taking measures in respect of, phenomena which are observable with chemical or physical measuring methods. What makes the phenomenon observable may be the signals the phenomenon generates and the system comprises at least one information contra with associated cells which can be divided into one or more groups. The system also comprises means for communication between the information centre and each cell. Each cell comprises at least one sensor, with which chemical or physical measuring methods can be used to observe the phenomenon or detect the signals which the phenomenon generates/emits. The system further comprises at least three cells which are distributed geographically in the area of interest in a sufficiently dense network. In these cells, the signals can be used for determining one or more of for example the time, location, intensity or type of the phenomena.

For determining the location, it may sometimes be advantageous to make use of the indication of a number of cells of the bearing of the phenomenon and then to combine/evaluate this in the information centre in order to obtain a more exact location of the phenomenon. In this case, use is made of a number of cells which, with the aid of their sensors, can "see" the phenomenon in order by these means to locate the same. Determining the type of phenomenon is of course of significance only if a number of types of phenomenon have been defined and included in the monitoring task.

There is also a need that some concentrated data about the phenomenon can be transferred from affected cells to their respective information centres for combining/evaluation and processing. Furthermore, there is a requirement that activities can be initiated and carried out by equipment inside or outside the cells in accordance with fixed rules which have been stored in the cells and that these activities are started as a response to said, identifiable signals. The rules can be based on the distinctive features of the detected signals which for example can be one of either frequency, frequency spectrum, amplitude, time of arrival, time spectrum or repetition frequency. An activity can also mean that the cell initiates contact with the information centre with for example information about possible positions or bearings to the phenomenon. The information can also for example comprise the time, intensity or type of the phenomena.

In many cases, it is easier to monitor locally a signal which indicates a phenomenon being sought which is taking place in the vicinity of a receiver. The signal is stronger than and does not compete with a number of other similar, disguising signals. These disguising signals would be detected by a receiver which has to act at a great distance from the phenomenon and which therefore by necessity is more sensitive. Many very simple receivers can therefore in many cases fulfil the intended task at a lower price than a few advanced pieces of equipment.

The present invention is distinguished in that both the monitoring tasks and the activities which can be initiated by the cells by signals coming from outside are carried out in an inexpensive, effective and robust manner. This is achieved according to the invention by a large number of relatively simple cells positioned densely in one area instead of complicated and expensive arrangements which are intended, in a small number, to cover and carry out the same function in the area.

BRIEF DESCRIPTION OF THE DRAWINGS

The invention will be described below in greater detail in an explanatory and in no way limiting manner, with reference to the attached drawings, in which.

DETAILED DESCRIPTION

In order to clarify the system according to the present invention, a few examples of its application will be described below in connection with FIGS. 1 to 3.

Figure 1:
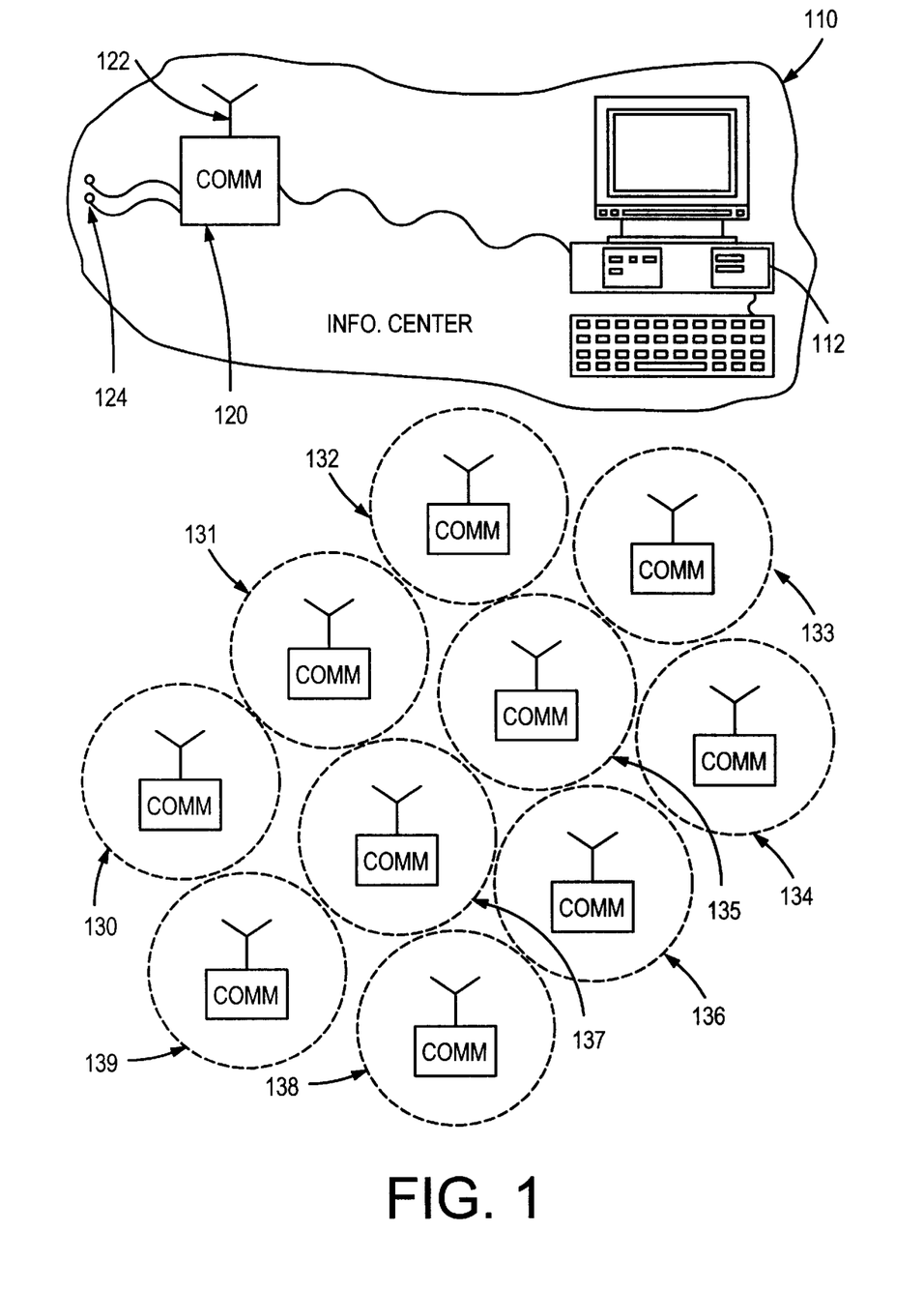
FIG. 1 illustrates a block diagram of a system according to the invention.

In FIG. 1, a diagrammatic block diagram of a system according to the present invention is shown The system is composed of a central unit 110, the information centre, and a large number of sub-units, cells 130–139, with which the information centre communicates and which are placed or installed in the geographical area which it is desired to watch over and/or monitor. Cells which are linked to an information centre and which have a distinctive feature, for example are located in a defined area, have a determined design or have a uniform and specific task, can be arranged in a group according to one or some of these criteria. This is so that inter alia it is possible for commands simply to be given to a number of cells simultaneously which means time savings in the data transfer between information centre and cell and it also produces a more easily understandable system.

The information centre comprises a data processor 112 which may be a PC or another data processor comprising program and data memory, input and output devices which can for example consist of a keyboard and a monitor and which have furthermore been prepared for external communication device 120. This communication device 120 can take place either in a wireless manner via antenna 122 or via wire 124 and be of a type for one-way or a type for two-way communication. If the communication with the cells takes place in a wireless manner, this can take place to a radio network, for example of the GSM (Global System for Mobile communication) or NMT (Nordic Mobile Telephony) type, or directly to the cells. If, on the other hand, the communication takes place via wire, this can take place to a telephone network, public or private, and then if appropriate via a radio network, for example GSM or NMT, or via wire directly to the cells. Wire means both optical and electrical conductor. In certain applications, it may be suitable to use other networks included in the national defence.

The cells are each linked to the information centre via means for data communication. All cells have an identification designation—an address/address code—which is unique for each cell. Correspondingly, each group of cells linked to one and the same information centre, in the systems which have divided all or certain cells into one or more groups, has a given group identification—a group address/group address code—which is to be found in each cell and is the same for all cells which belong to the same group. Furthermore, it is also possible to have a system identification—a system address/system address code—which is common to all cells which belong to the same system. There may be a number of systems which are operational at the same time and, in order that information and commands do not end up in the wrong place, this system identification/system address affords a possibility of distinguishing between different systems.

The address code of the cell and if appropriate of the group is used in all communication between information centre and cell as call address(es) and in communication between cell and information centre as identifier of the individual cell or the group. If there exists a system address/system address code in the system then this is used in all communication as well.

Figure 2:
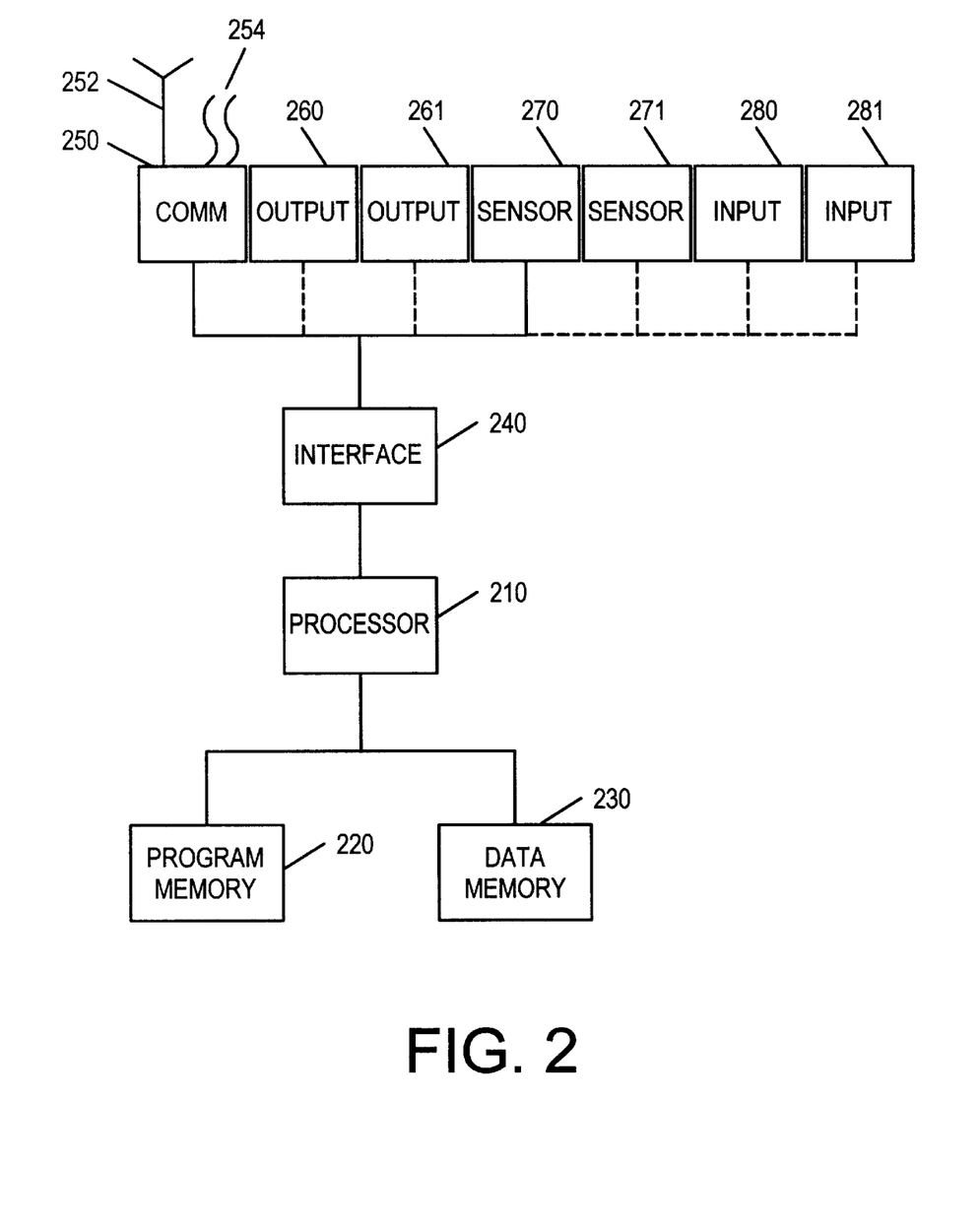
FIG. 2 illustrates a block diagram of an embodiment of a cell according to the present invention.

FIG. 2 shows a block diagram of an embodiment of a cell. Each cell is provided with one or more sensors 270, 271 which are intended to receive acoustic, optical, electromagnetic or mechanical signals at or near the cells. For detection of phenomena such as boats, aircraft or helicopters the sensors could if appropriate be intended for electromagnetic signals in the radio-frequency range for detection of radar signals for example. Mechanical signals can for example be vibrations or movements such as seismologic. Chemical sensors can also be envisaged, for example for certain types of air or water pollution. Two or more sensor types can act in combination in more complicated embodiments. The response of the cell to signals with certain properties being sought within the area of sensitivity of the respective sensor is defined autonomously within the cell by criteria and parameters which have been selected from a set of criteria and parameters which has been previously established or a set of criteria and parameters transmitted via data communication, in order to achieve the intended function.

The cells also comprise a control computer which comprises a processor arrangement 210 with program memory 220 and data memory 230 in order to make it possible for the cell to function autonomously. The program memory 220 can contain programs for basic functions in the cell such as communication and furthermore one or more function programs which define how the cell will behave in relation to its environment with the aid of criteria and various parameters. When the program memory contains a number of function programs, selection between these can be made before the cells are placed, by clock control or by command via communication with the information centre. There can also be space in and the possibility of adding a number of function programs to the program memory (i.e. that the program memory is (re)programmable), and this can then be carried out from the information centre via the communication means. This affords a possibility of changing the setting of or improving the tasks which have been placed on the cell.

Also linked to the processor arrangement of the cell is an adaptation/interface arrangement 240 which adapts/ interfaces signals to and from the processor arrangement and a communication arrangement 250, one or more sensor arrangements 270, 271, and if appropriate one or more output arrangements 260, 261 and if appropriate, in addition to the sensor arrangement(s), a further one or more input arrangements 280, 281.

The communication arrangement 250 may be of a type for one-way or a type for two-way communication. The communication method may be either in a wireless manner via antenna 252 to a radio network, for example GSM or NMT, or directly to the information centre, or via wire 254 to a public or private telephone network or directly to the information centre. The one or more output arrangements 260, 261, if present, can in their simplest form consist of an electrical signal which in turn controls an external arrangement of some type. The output arrangements can also consist of sound sources, light sources or electromagnetic interference sources such as jammers.

Essential for a practical realization of the present invention is that country-wide infrastructures existing in the community are used for data communication between the information centre and the cells. In most applications of the invention, it is sufficient that the data transfer rate between information centre and cells and vice versa is low and not of a real time nature.

Data communication between information centre and cell is established as mentioned earlier with the aid of a line telephone network such as the national telephone network, with the aid of one or more mobile telephone networks, via MOBITEX, or via national FM transmitters in the same manner as in the system MINICALL (RDS—Radio Data System and equivalent). The two former means allow, for the most part, two-way data transfer with data/fax modem between data processors in both information centre and cell. The means for one-way communication allow data exchange only in the direction from information centre to cell or in certain cases the opposite direction, which can, however, be sufficient in certain applications of the system or in a special function phase of the system.

The system is designed so that the cells, with great freedom in the selection of place, can be positioned for example in an area of terrain. This freedom can be achieved because the supply of power can as well be provided by batteries and/or solar cells and that the communication can be achieved by wireless data transfer. If the information centre is to be handled by an operator, it is expediently positioned indoors in an arbitrary place which preferably does not lie in the monitoring area. The number of cells which are assigned to a group under one information centre can easily be adapted for a current task as can the number of groups under one and the same information centre.

In order to facilitate free positioning of the cells in a group in an application for active service, it is essential that the requirement of electrical power for electrical and electronic equipment in the cell is minimized. One method is to reduce the power consumption greatly in time intervals when the cell is not meeting an acute need, which presupposes that the active application is only sporadic. With one-way communication from information centre to cell, the cell can be ordered to shut off all power consumers except one receiver, for example of the MINICALL type, or a time delay (timer) which is used either to reset the power of the entire cell or only for starting a limited working mode of the cell like for example a function control. Thanks to these long periods of passivity, the cell can be supplied with power by a battery and/or solar cells with a capacity calculated only for the relatively short time periods when the cell is expected to be active.

Another advantage is that the cell, in a mode which has power supplied only to the one-way communication, or which has only one-way communication, cannot be located via emitted radiation or other activity which can reveal its existence.

Another similar application of one-way communication is selection of the signal profile which, in a certain situation, is to be recognized by the cell amongst a plurality which have previously been programmed into the program memory of the cell or the characteristics of which can, with a small number of parameters, be transmitted to said memory for signal identification. In this case, one-way communication is sufficient if for example acknowledgement of the command is not required.

The signal profile may for example consist of one or more of frequency, pulse length, coding or pulse repetition frequency which radar signals from a radar transmitter comprises. When the cells have been given a command to function in an active mode via one-way communication from an information centre, in accordance with given criteria, which for example include the signal profile, the cells which are exposed to the main lobe of said radar transmitter can be activated. The activation of the cell may mean that a jammer/interference transmitter counteracting a radar transmitter with a desired signal profile, is started. In this way, the invention functions as an advanced jammer system with one-way communication from information centre to cells. An information centre can thus activate and deactivate one or more cells and/or one or more groups of cells and transmit signal profiles and criteria which define in which way individual or groups of cells are to function when exposed to radar signals from a radar transmitter. The function can extend all the way from the cell activating a jammer/interference transmitter as soon as it is exposed to a radar signal to the cell only activating the jammer/interference transmitter for a specific radar signal from one or more specific radar transmitters.

The following examples illustrate embodiments of the present invention which utilize two-way communication between information contre and cells, for example by utilizing mobile telephones and mobile telephone networks of the NMT or GSM type. It is to be pointed out here, however, that in spite of the fact that the following examples utilize two-way communication, one-way communication from information centre to cell may be sufficient in most of the examples in order to ensure the desired effect.

In order that the meteorological service can obtain an idea of the extent of a rain front, the quantity of rainfall and the intensity, a number of cells are placed in the geographical area which is of interest. The cells which are densely located in the area are equipped with an inclined plate to which a microphone is acoustically coupled. When the rain falls on this plate, the microphone records the sound and, with the aid of the signal spectrum which is then generated, the cell can calculate the intensity of the rain and if appropriate the quantity of rain. Alternatively, the rain intensity can be determined by repeated volume measurements. The cells report for example the intensity as a certain value to the information centre which, with knowledge of where the various cells are geographically located, can combine all this information and calculate how the rain front appears and what extent it has.

The reporting can either take place at certain determined times or be event-controlled, that is to say the reporting takes place when a certain event has occurred. Such an event may for example be that the rain intensity exceeds an established value.

Pollution is something which we encounter from the air and from water. By exchanging, or supplementing, the microphone (sensor) in the preceding example for/with one or more sensors for the pollution which is of interest, a system has been obtained which can, in the information centre, combine information from a large number of cells in order to be able to calculate how the pollution is moving and give an alarm in the event that unacceptable levels are exceeded.

In a third example, the system is intended for listening to and reporting sound characteristic of low-flying helicopters which are expected to fly close over cells located in a large section of terrain. These cells have been provided with a timer—clock—which can be synchronized via a group-addressed or system-addressed synchronization code from the information centre or via an external time reference such as e.g. DCF-77 from Frankfurt, Germany, a time signal of a national radio network or some other time reference transmitted by radio. Synchronization signals (line and picture synchronization) which are included in TV signals can also be used. In the latter cases, these cells can also each be provided with their own radio/TV receiver for direct reception of the transmitted reference, which is connected to an arrangement which automatically fine-synchronizes the clock of the cell to the time reference/time signal. Reception of the time reference/time signal can take place either continuously or only at determined times.

When the cells have been given the command to function in an active mode and helicopters are flying over the area, the cells, which in accordance with given criteria have detected the helicopter sound, report, for example via a mobile telephone network. The criteria may be at what time the sound for each individual helicopter has reached maximum, that the helicopter is "stationary" in relation to the cell, when a helicopter flies over the cell, or that the helicopter disappears outside the area of sensitivity of the sensors belonging to the cell. In order to establish which of the criteria has been met, the cell in this example utilizes the sound "signatures", that is to say the frequency spectrum which the helicopters, which are the phenomena in this example, transmit over the time. The reports consist of digital codes according to a standardized protocol.

The reports are combined/evaluated in the information centre and processed so that the flight and altitude of the helicopters can be successively followed and predicted (manually and/or automatically with the aid of a computer). The altitude can be determined since the microphones of the cells suitably have their sensitivity delimited downwards in altitude. The further away from the flight path calls can detect the sound, the higher the helicopter is. After for example checking the authorization of the helicopters, permission is given for various types of measures, which may be switching on of landing lights to a special group of cells which have landing lights connected. Landing lights can be switched on via a data order from the information centre to the control computer of the cells in order thus to indicate for example a landing ground. The cells in the landing light group have the same capacity to listen to and recognize helicopter sound as the cells in the group mentioned previously but have moreover been provided with data capacity in order automatically to order switching on of landing lights as a response to the helicopter sound according to the criteria and parameters which have been transmitted to the group.

In order to illustrate the broad application of the invention, the helicopter sound in the last two-way example above can be replaced by radar signals. A given radar transmitter, the characteristics of which have been indicated in frequency, pulse length, pulse repetition interval, can be discovered and identified by the cells. The radar signals are used not to switch on landing lights but to start a transmitter of electromagnetic signals, for example jamming/interference signals, towards this type of radar.

The two-way communication is in this case used in one direction in order to notify the information centre that the cell has been exposed to specific identified radar transmitters. In the other direction, the information centre orders the cell, after a suitable situation has arisen, to start jammer/interference transmission next time one or more identifiable radar signals, among a number specified, are detected. The cell logs, that is to say stores, events of the type ordered which have occurred, inclusive of times of the events, and transmits this information to the information centre on request, when certain criteria have been met, with a time interval, at or after a certain time. In this way, the invention has been used as a qualified jamming/interference arrangement with a reporting possibility without anything having been changed in principle in the arrangement according to the invention.

With a jammer/interference arrangement according to the invention, the cells in a group are geographically located with such small gaps that said reconnaissance radar, in its antenna sweep, constantly has at least one cell in its main lobe. The sensors in the cells are furthermore adapted to receive and identify the main lobe signals of the reconnaissance radar, for example the occurrence of the main lobe signal and/or determination of one or some characteristics such as frequency, pulse repetition frequency, coding or pulse length. The cells are also equipped with relatively weak noise transmitters which are activated only on exposure to the main lobe of said reconnaissance radar. Thanks to a jammer/interference arrangement according to the invention, a good jamming/interference effect is achieved with a very simple and robust arrangement.

The jamming/interference effect is at least as good as the previously described conventional method of jamming/interference which, with a suitably positioned jammer unit, transmits noise interference with a high antenna gain and high power output around the active transmitting frequency of the reconnaissance radar. Low demands are made of the receiver/transmitter antennas of the cells in terms of antenna gain/directivity and side lobe performance. The functional loss of individual cells is of marginal significance and interference with one's own radar equipment can be minimized which is due to, among other things, the large number of densely located cells. The method is particularly suitable in defence of one's own territory as the correct positioning of the arrangements can be prepared in peace time.

Figure 3:
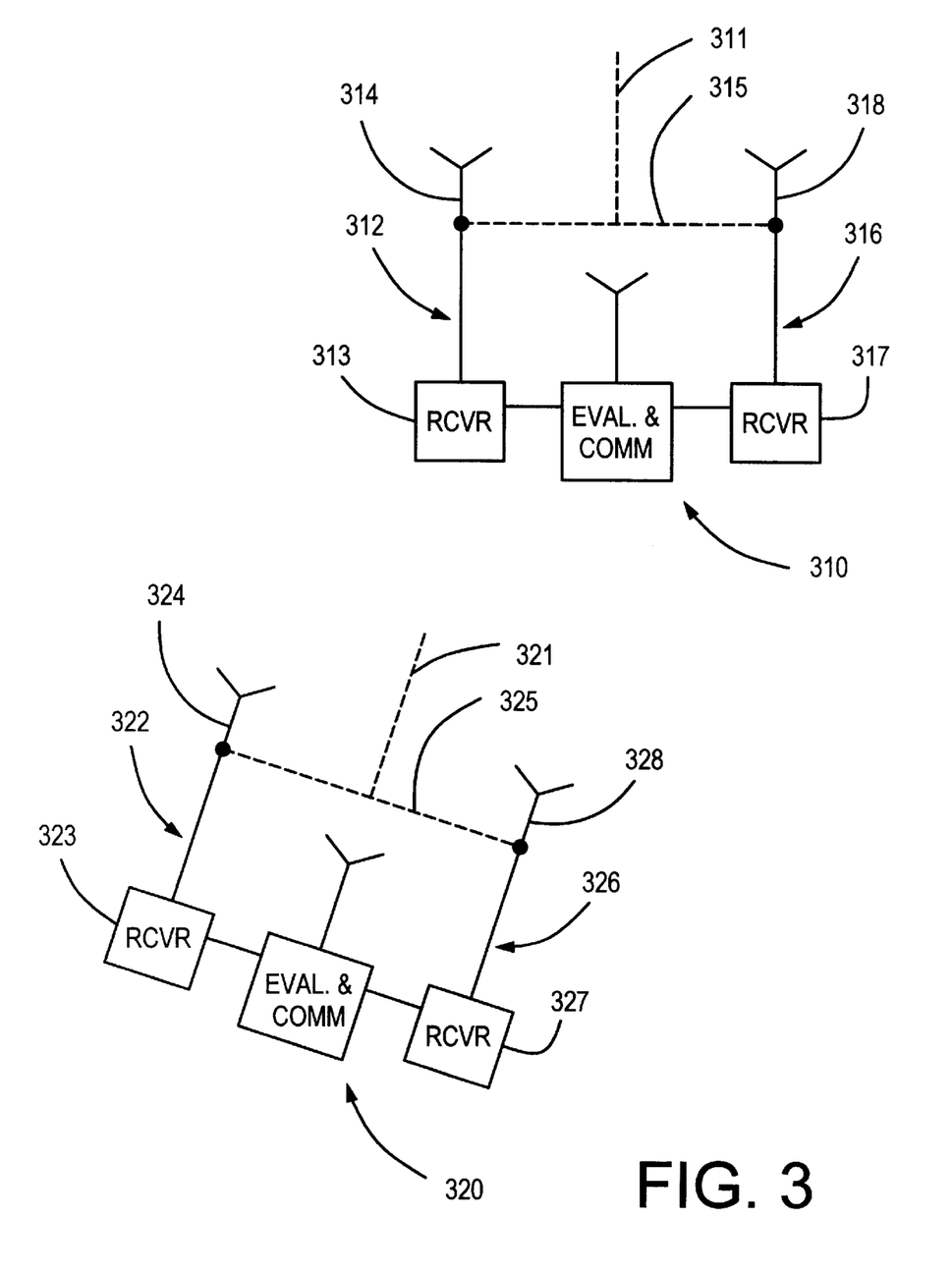
FIG. 3 illustrates an embodiment of the present invention for determining a bearing.

In a further example of the invention and its flexibility, with reference to FIG. 3, a number of cells 310, 320 which can for example form a group, are provided with sensors 312, 316, 322, 326 in the form of receivers which can detect and if appropriate identify radar or radio transmitters. The cells 310, 320 can determine with their sensors the direction of the transmitters and, with the aid of these cells, the location of the transmitter can be determined in the information centre.

In order to increase the accuracy in determining the direction in this example or in other cases where great accuracy is required in another application, the cells can also be provided with receivers with the aid of which an internal precision clock in the cell can be synchronized with an external time reference. The external time reference may be for example signals from the GPS system, DCF-77 from Frankfurt in Germany, a national radio network's time signal, the TV network picture and line synchronization signals or another time reference transmitted by radio, TV or wire. The selection of reference is inter alia dependent upon which absolute and relative time accuracy is required in the application of interest.

With at least two receivers 313, 317, 323, 327 in each cell and respective receiver antennas 314, 318, 324, 328 belonging to the receivers, the bearings relative to each cell to a transmitting radar or radio transmitter, the signal of which has been detected and if appropriate also identified by the respective cell, can be determined. The antennas must be placed at a fixed, accurately known distance from one another and in places so that the geographical direction of the normal 311, 321 to the line (base line) 315, 325 between them is known. The determination can be carried out using a known technique, in which connection the interferometer and time of arrival (TOA) methods will be described in greater detail.

In the interferometer case, the receiver antennas should be positioned at a distance from one another of one or a few wavelengths of the carrier wave frequency of the signal being sought. With the aid of accurately electrically matched receivers, the difference in phase of the received carrier wave frequency between the two receivers is compared in an evaluation unit in the cell. The system in the cell should be electrically symmetrical seen from the evaluation unit towards the two receiver antennas.

The phase difference at a given frequency is a measure of the time difference which has arisen for the signal of interest as a result of the difference in the path of propagation from the transmitter to the respective receiver antenna. The phase difference 0 corresponds in the case of full symmetry to the same propagation path length, which means that the transmitter is situated on the normal from the central point on the line between the antennas (the base line for bearing measurement). The carrier wave frequency constitutes in this case the relative time reference for the two receivers of the cell From the difference in propagation path, the bearing to the transmitter (in reality circles which represent the location for possible positions of the transmitter relative to the central point of the measuring base for a given time difference) relative to the direction of the base can be calculated with possible ambiguity if the phase difference exceeds 180°. The ambiguity can be resolved with the aid of established methods for this methodology.

The bearing measured in a cell for a signal of interest at or close to signal maximum (when the cell is covered over by the main lobe) is recorded together with a time indication for the measurement. The time indication should have sufficient accuracy so that it will be possible for a corresponding measurement made in another cell at a suitable distance from the first cell to be attributed with reasonable certainty to covering over of the same transmitter from approximately the same position.

With the aid of reports to an information contra from a number of cells, an evaluation unit in the information center can, from the bearings reported from at least two cells positioned at a suitable distance which were recorded at times which are so close that they can be attributed to one and the same covering-over sweep, locate the position of the transmitter provided that the large measuring base (the measuring base for cross bearing), namely that between cells of interest, is also known in terms of length and geographical direction.

The method which has been called TOA is similar in terms of its principle; with the aid of measured propagation time differences to two receiver antennas for signals from the same transmitter, the bearing of the transmitter can be determined. Instead of measuring the phase difference, in this case the difference in time of arrival for one and the same pulse in both the receiver antennas is measured. For example, the time position for pulse front edges for a pulse is measured and compared, or even better for a large number of consecutive pulses in order to increase measuring accuracy.

In this case also, a symmetrical arrangement is suitable, but there are established methods for compensating for the propagation times in the electrical connections so that the measured time difference 0 between the pulses in both the receiver antennas means that the transmitter is situated on the normal through the central point on the base line (bearing). The methods can be made to meet requirements for accuracy under varying external conditions like for example different ambient temperatures. In the case of TOA measurement, the length of the measuring base can be longer—kilometers instead of parts of meters in the case of measuring towards an X band transmitter (10 GHz range). This means that preferably use should be made of two different cells, each with at least its own antenna and receiver, positioned at a distance from one another and that the signals from these cells are compared. Accurate time measurement or time synchronization is necessary in this case. The bearing measurements from a number of cells or "cell pairs" are moreover used in the same way as in the interferometer case in order to determine the position of the transmitter.

The invention is not limited to the embodiments mentioned above but can be varied within the scope of the patent claims which follow.

What is claimed is:

1. System for surveillance of determined phenomena, that emit signals with a geographically limited and time-varying geographical distribution, in a geographical area in which these phenomena can be detected with the aid of the signals which the phenomena emit,     at least one information centre arranged to control sub-units belonging to the system via information transfer,     at least three cells for each information centre included in the system, where these cells are arranged to function as sub-units for an information centre and where certain of these cells are arranged so that, from this information centre via the information transfer, they can be activated and deactivated and, with the aid of sensors, detect the signals which the phenomena emit, at least two of said cells detecting signals emitted by the same phenomena, and where certain of these cells, from distinctive features of the detected signals, in dependence upon decision criteria stored in the cells and without cooperation of the information centre, can determine whether to activate at least one output signal.

2. System according to claim 1, wherein the information transfer utilizes a communication network.

3. System according to claim 1, wherein the system comprises one or more groups where one or more cells are, according to determined criteria, assigned to one of said groups and where said criteria according to which a cell is assigned to a certain group comprise one or more of the function of the cell, the design of the cell, the type of information transfer of the cell and the geographical positioning of the cell.

4. System according to claim 3, wherein each cell has a unique address code and each cell assigned to a group has a group address which is the same for all cells which belong to the same group.

5. System according to claim 1, wherein the cells can be loaded with new parameters from an information centre, where these parameters define the phenomenon and constitute the decision basis for the cell.

6. System according to claim 1, wherein each cell comprises a number of different programs for functioning and decision-making and an information centre can, via the information transfer, optionally activate any one of these programs.

7. System according to claim 6, wherein the cells can receive and store one or more new programs from an information centre.

8. System according to claim 1, wherein at least one cell comprises means for one-way communication between an information centre and the at least one cell.

9. System according to claim 1, wherein at least one cell comprises means for two-way communication between an information centre and the at least one cell.

10. System according to claim 8, wherein at least one cell comprises a receiver which receives time signals for setting up and fine-adjustment of a real-time clock in the cell.

11. System according to claim 1, wherein the distinctive features of the detected signals comprise one of frequency, frequency spectrum, amplitude, time of arrival, time spectrum and repetition frequency.

12. System according to claim 1, wherein the signals that the phenomena emit are electromagnetic signals.

13. System according to claim 12, wherein electromagnetic signals are in a radio frequency range and comprise radar signals.

14. System according to claim 1, wherein the signals that the phenomena emit are mechanical signals.

15. System according to claim 1, wherein the signals that the phenomena emit are acoustic signals.

16. System according to claim 1, wherein the output signal comprises at least one of an optical, electromagnetic, acoustic or electrical signal.

17. System according to claim 1, wherein at least two of the cells each comprise, for determining a bearing to the phenomenon, two sensors.

18. System according to claim 1, wherein the bearing to the phenomenon is determined by comparing signals measured in two cooperating cells.

19. System according to claim 17 wherein the system can determine the position of the phenomenon by coordinating bearing information.

20. System according to claim 1, wherein at least one cell is arranged to emit electromagnetic signals via the output signal.

21. System according to claim 1, wherein a cell can determine whether to activate the at least one output signal only when the cell is in an active state.

22. System according to claim 9, wherein at least one cell comprises, for setting up and fine-adjustment of a real-time clock in the cell, a receiver which receives time signals.

23. System according to claim 18, wherein the system can determine the position of the phenomenon by coordinating bearing information.

24. System for surveillance of transmitters, that emit electromagnetic signals with a geographically limited and time-varying geographical distribution, in a geographical area in which these transmitters can be detected with the aid of the signals which the transmitters emit, at least one information centre arranged to communicate with sub-units belonging to the system via information transfer which utilizes a communication network;

at least three cells for each information centre included in the system, where these cells are arranged to function as sub-units for an information centre and where certain cells are arranged so that, from an information centre via the information transfer, they can be activated and deactivated and, with the aid of sensors, detect the signals which the transmitters emit, at least two of said cells detecting signals emitted by the same transmitters and, from distinctive features of the signals detected, determine whether to activate at least one output signal where this output signal in at least one of the cells comprises transmission of electromagnetic signals;

one or more groups where one or more cells are, according to given criteria, assigned to one of the groups and where the criteria according to which a cell is assigned to a certain group comprise one or more of the function of the cell, the design of the cell, the type of information transfer of the cell and the geographical positioning of the cell and where each cell has a unique address code for the information transfer and each cell assigned to a group has a group address code for the information transfer which is the same for all cells which belong to the same group.

25. System for surveillance of transmitters, generating signals in the form of signals with a geographically limited and time-varying geographical distribution, in a geographical area in which these transmitters can be detected with the aid of the signals which the transmitters generate, comprising:

at least one information centre arranged to communicate with sub-units belonging to the system via information transfer which utilizes a communication network;

at least three cells for each information centre included in the system, where these cells are arranged to function as sub-units for an information centre and where certain cells are arranged so that, from an information centre via the information transfer, they can be activated and deactivated and, with the aid of sensors, detect the signals which the transmitters generate, at least two of said cells detecting signals emitted by the same phenomena, and where at least two cells each comprise means for determining a bearing to the transmitters, and where each cell, from distinctive features of the signals detected, can determine whether to activate at least one output signal;

one or more groups where one or more cells are, according to given criteria, assigned to a group and where the criteria according to which a cell is assigned to a certain group comprise one or more of the function of the cell, the design of the cell, the type of information transfer of the cell and the geographical location of the cell and where each cell has a unique address code for the information transfer and each cell assigned to a group has a group address code for the information transfer which is the same for all cells which belong to the same group.

26. System for surveillance of determined phenomena in a geographical area in which these phenomena can be detected by means of one or more sensors, comprising at least one information centre arranged to communicate with sub-units belonging to the system via information transfer which utilizes a communication network;

at least three cells for each information centre included in the system, where these cells are arranged to function as sub-units for an information centre and where certain cells are arranged so that, from an information centre via the information transfer, they can be activated and deactivated and, with the aid of sensors, detect the phenomena, at least two of said cells detecting signals emitted by the same phenomena, and where each cell, from distinctive features of signals from the sensors, in dependence upon decision criteria stored in the cells and without cooperation of the information centre, can determine whether to activate at least one output signal;

one or more groups where one or more cells are, according to given criteria, assigned to a group and where the criteria according to which a cell is assigned to a certain group comprise one or more of the function of the cell, the design of the cell, the type of information transfer of the cell and the geographical location of the cell and where each cell has a unique address code for the information transfer and each cell assigned to a group has a group address code for the information transfer which is the same for all cells which belong to the same group.

* * * * *